Patented Aug. 21, 1934

1,970,643

UNITED STATES PATENT OFFICE 1,970,643

ANTHRAQUINONE-1-ALDEHYDES AND PROCESS OF MAKING SAME

Otto Bayer, Frankfort-on-the-Main, Germany, assignor to General Aniline Works, Inc., New York, N. Y., a corporation of Delaware No Drawing. Application May 12, 1931, Serial No. 536,933. In Germany June 4, 1930

6 Claims. (Cl. 260—57)

My present invention relates to anthraquinone-1-aldehydes and to a process of making same.

The process of this invention comprises acting with an oxidizing agent of the group consisting of oxides and salts of tri- and tetravalent manganese and lead on 1-methyl-anthraquinone which may be substituted in the nucleus in the presence of a sulfuric acid of 50–90% strength at a temperature ranging from 0–80°. The diluent of the sulfuric acid used may be water, glacial acetic acid or another suitable solvent.

The quantity of the oxidizing agent used may be varied within fairly wide limits. It is advisable to ascertain the optimum amount by a previous test, since the brands, for example of manganic peroxide of different origin have quite a different effect. By the action of an excess of oxidizing agent, the anthraquinone-1-aldehyde compounds can be easily transformed into the corresponding carboxylic acids (see French Patent 456,768, Example 3).

In this manner antraquinone-1-aldehydes are obtained with a good yield whereas the manufacture of these compounds hitherto involved such difficulties that the simplest representative of this series, i. e. anthraquinone-1-aldehyde itself, has not yet been described in literature. By the oxidation of 1-methyl-anthraquinone bimolecular compounds were obtained (see German Patent No. 481,291). Also by oxidizing 4-chloro-1-methyl-anthraquinone (see French Patent No. 456,768) only a small yield of the aldehyde could heretofore be produced.

The anthraquinone-1-aldehyde and its nuclear substitution products which are obtained by my process are mainly unknown hitherto. They represent valuable intermediates for the production of dyestuffs. They are distinguished by the intense blue color which appears by heating the solution in glacial acetic acid with a drop of aniline, and by the reddish coloration of the products obtained on exposure to light.

In order to further illustrate my invention the following examples are given, the parts being by weight and all temperatures in centigrade degrees, but it is however to be understood, that my invention is not limited to the particular products nor reacting conditions mentioned therein.

Example 1

50 parts of 1-methyl-anthraquinone are dissolved at 50° in 900 parts of 84% sulfuric acid. Thereto a paste of 90–100 parts of artificial pyrolusite of about 60% strength and 1000 parts of 80–83% sulfuric acid is added during 2 hours while stirring, the temperature being maintained at 55–65° by temporary cooling. The color of the oxidation mass remains light yellow (in contradistinction to the process of German Patent No. 481,291).

When the oxidation is finished, the mass is poured into water, the anthraquinone-1-aldehyde precipitated in the form of colorless flakes is filtered and washed acid-free. By extracting it with sodium carbonate solution it is purified from the anthraquinone-1-carboxylic acid simultaneously produced.

The new anthraquinone-1-aldehyde of the formula

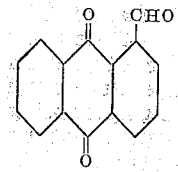

melts at 183–185°. It forms a reddish brown vat and a light yellow sulfuric acid solution.

The process may likewise be carried out at low temperature or by replacing pyrolusite by manganic sulfate, lead peroxide or lead tetracetate.

Example 2

100 parts of 4-chloro-1-methyl-anthraquinone are dissolved in a mixture of 1700 parts of 96% sulfuric acid, 180 parts of glacial acetic acid and 90 parts of water. Into this solution 120 parts of pyrolusite of 75% strength which are made up to a paste with the same quantity of the aforesaid mixture of sulfuric acid, acetic acid and water are introduced at about 40–50° during 2 hours while stirring. When the whole amount of pyrolusite has been disappeared the light yellow reaction mass is poured while stirring into water which is advantageously mixed with 1 part of bisulfite solution. The raw product forming colorless flakes is filtered and washed until being free from acid. By digesting it with a dilute solution of sodium carbonate its content of 4-chloro-anthraquinone-1-carboxylic acid (about 15–20%) is removed. In this manner nearly pure 4-chloro-anthraquinone-1-aldehyde of the formula

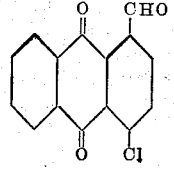

is obtained. It melts when recrystallized from glacial acetic acid or from xylene at 216°. By increasing the amount of acetic acid the concentration of sulfuric acid may be diminished until about 50% without influencing the course of reaction.

*Example 3*

When 1.4-dimethyl-anthraquinone is treated according the foregoing examples 4-methyl-anthraquinone-1-aldehyde of the formula

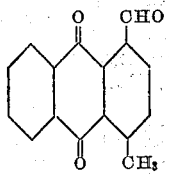

is obtained which melts at 180° and shows otherwise similar properties as the product of Example 1.

By using in this case an excess of the oxidizing agent there are produced 4-methyl-anthraquinone-1-carboxylic acid, anthraquinone-4-aldehyde-1-carboxylic acid and anthraquinone-1.4-dicarboxylic acid.

By starting from 1.3-dimethyl-anthraquinone 3-methyl-anthraquinone-1-aldehyde is produced which yields on further oxidation 3-methyl-anthraquinone-1-carboxylic acid.

I claim:

1. A process for the manufacture of anthraquinone-1-aldehydes which comprises acting with an oxidizing agent of the group consisting of oxides and salts of tri- and tetravalent manganese and lead on 1-methyl-anthraquinone which may contain in 3 or 4-position a further methyl group in the presence of a sulfuric acid of 50–90% strength at a temperature ranging from 0–80° a quantity of oxidizing agent being employed which is proved by a test to give about two atomic proportions of active oxygen.

2. A process for the manufacture of anthraquinone-1-aldehyde which comprises acting with manganic peroxide on 1-methyl-anthraquinone in the presence of sulfuric acid of 75–90% strength at a temperature ranging from 40–80° a quantity of oxidizing agent being employed which is proved by a test to give about two atomic proportions of active oxygen.

3. A process for the manufacture of 4-methyl-anthraquinone-1-aldehyde which comprises acting with manganic peroxide on 1.4-dimethyl-anthraquinone in the presence of sulfuric acid of 75–90% strength at a temperature ranging from 40–80° a quantity of oxidizing agent being employed which is proved by a test to give about two atomic proportions of active oxygen.

4. As new compounds the anthraquinone-1-aldehydes of the general formula

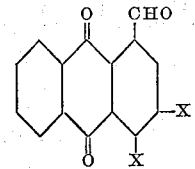

(wherein one X means hydrogen, the other X hydrogen or a methyl-group) which compounds are distinguished by the intense blue color which appears by heating the solution in glacial acetic acid with a drop of aniline and by the reddish coloration of the products obtained on exposure to light.

5. As a new compound the anthraquinone-1-aldehyde of the formula

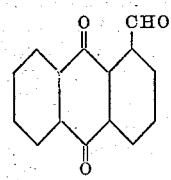

which compound melts at 183–185°, forms a reddish brown vat and light yellow sulfuric acid solution and is distinguished by the intense blue color which appears by heating the solution in glacial acetic acid with a drop of aniline and by the reddish coloration of the product obtained on exposure to light.

6. As a new compound the 4-methyl-anthraquinone-1-aldehyde of the formula

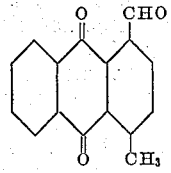

which compound melts at 180°, forms a reddish brown vat and light yellow sulfuric acid solution and is distinguished by the intense blue color which appears by heating the solution in glacial acetic acid with a drop of aniline and by the reddish coloration of the product obtained on exposure to light.

OTTO BAYER.